(12) United States Patent
Fukuda

(10) Patent No.: US 7,615,964 B2
(45) Date of Patent: Nov. 10, 2009

(54) RECHARGEABLE BATTERY CHARGING METHOD

(75) Inventor: Tomoya Fukuda, Minami-awaji (JP)

(73) Assignee: Sanyo Electric Co., Ltd., Osaka (JP)

( * ) Notice: Subject to any disclaimer, the term of this patent is extended or adjusted under 35 U.S.C. 154(b) by 488 days.

(21) Appl. No.: 11/526,032

(22) Filed: Sep. 25, 2006

(65) Prior Publication Data

US 2007/0069691 A1 Mar. 29, 2007

(30) Foreign Application Priority Data

Sep. 27, 2005 (JP) .............................. 2005-280965

(51) Int. Cl.
*H02J 7/00* (2006.01)
*H02J 7/04* (2006.01)
(52) U.S. Cl. ..................... 320/125; 320/130; 320/133; 320/134; 320/151; 320/153; 320/122; 320/160
(58) Field of Classification Search .................. 320/125, 320/130, 133, 134
See application file for complete search history.

(56) References Cited

U.S. PATENT DOCUMENTS 5,818,202 A 10/1998 Miyamoto et al.
6,674,265 B2 * 1/2004 Yoshida et al. .............. 320/125

FOREIGN PATENT DOCUMENTS

| JP | 09-007643 | | 1/1997 |
| JP | 2005-065476 | * | 8/2003 |
| JP | 2005-65476 | | 3/2005 |
| JP | 2005-80373 | | 3/2005 |

* cited by examiner

*Primary Examiner*—Edward Tso
*Assistant Examiner*—Yalkew Fantu
(74) *Attorney, Agent, or Firm*—Wenderoth, Lind & Ponack, L.L.P.

(57) ABSTRACT

A method for charging a secondary battery with a constant current, in which a peak of output voltage is detected by utilizing a predetermined current value, and then the battery continues to be charged with a current value lower than the predetermined current value, so that the peak of output voltage or a voltage drop subsequent to the peak is detected, or alternatively a timer may be used, for termination of the charging operation.

15 Claims, 4 Drawing Sheets

PRIOR ART

RECHARGEABLE BATTERY CHARGING METHOD

BACKGROUND OF THE INVENTION

The present invention relates to a method for charging a secondary battery or cell (hereinafter referred collectively to as a "battery").

In a prior art, methods of rapidly charging a secondary battery are disclosed by Unexamined Japanese Patent Application (Kokai) Nos. 2005-65476 and 2005-80373. These patent documents respectively teach a method in which a battery temperature is detected to control an average charge current. The method includes: (a) a thermally elevating stage where a battery is charged with a large current which would cause a battery temperature to be elevated, so that the temperature is allowed to rise to a level fixed for temperature retention; and (b) a subsequent, thermally retained stage where the battery is charged by controlling an average charge current, so that the temperature will be maintained at the level fixed for temperature retention.

SUMMARY OF THE INVENTION

In such battery charging method, however, the average charge current needs to be controlled so that the battery temperature may remain constant, which requires a complex control. Also in controlling for a constant battery temperature, the temperature needs to be precisely measured, but difficulties often arise in stably measuring the battery temperature. In addition, a thermally controlled charging operation is susceptible to ambient temperature, thus making it difficult to charge a battery in a stable manner. Especially when such charging method is employed for a detachable type of battery, like for a cylindrical, AA-sized battery, a normal measurement of the battery temperature is found to be difficult in a state where the battery is installed in or on a battery charger, with its temperature measuring device being kept in close contact with the battery. For example, when there occurs a gap between the battery and the temperature measuring device in the charger or when foreign matter is present between the device and the battery, it is difficult to measure a battery temperature in a normal manner, for performing an charging operation.

Alternatively to such method, when charging a battery with a large current value, being equal to approximately 3.5 C (or 3.5 It) but preferably equal to or larger than 3 C, it is possible to determine a state of full charge by detecting a voltage drop subsequent to a peak voltage (hereinafter referred to as a voltage drop $(-\Delta V)$), as indicated by a characteristic graph in FIG. 4. In this method, however, a battery temperature is sharply elevated immediately prior to the full charge, with such thermal elevation adversely affecting the secondary battery. In addition, a charging operation with a large current is subjected to a poorer charging efficiency, and an efficiency is still found to be poor at an elevated, higher temperature, so that a sufficient charge capacity is not obtained. Actually, when the battery is discharged to check that charge capacity, the battery is found to be 79.8% charged with respect to a specified capacity.

As can be seen in FIG. 4, even after the secondary battery has been exposed to a cooling fan, its temperature is sharply elevated immediately prior to a full charge.

The present invention has been made in order to solve the aforesaid problems. It is an object of the invention to provide a battery charging method, in which a charging operation is less susceptible to ambient circumstances; a lowered battery performance is reduced to minimum; and a battery is capable of being charged within a shorter duration of time.

Disclosed in the present invention is a method for charging a secondary battery with a constant current, in which method a first peak of output voltage is detected in the secondary battery by utilizing a predetermined current value, and the battery continues to be charged with a current value lower than the predetermined current value, so that a charging operation is controlled by detecting a second peak of the output voltage or a voltage drop $(-\Delta V)$ subsequent to the peak.

In the inventive charging method as described above, the output voltage is detected at its peak, which is advantageous in that the battery can be charged without being influenced by ambient temperature and also in that a thermal elevation is smaller than when detecting a voltage drop $(-\Delta V)$ while being charged with a large current, so that the battery is less likely to be adversely affected by such a thermal elevation. Furthermore, after detection of the peak output voltage, the battery continues to be charged with a current value lower than the predetermined current value, so that it is especially possible to eliminate a poor efficiency as seen when charging with a large current immediately prior to the full charge and also to increase a charge capacity by applying a lowered current value.

The present invention is also characterized in that the predetermined current value is 3 C or more. An additional feature in the invention is that a non-charging, rest time (hereinafter referred to as a "rest time") is provided between the completed detection of the peak output voltage in the secondary battery and the stage of charging with a current value lower than the predetermined current value.

The invention is further characterized in that the peak is detected when an increase gradient of the output voltage becomes smaller than a fixed gradient and in that the gradient fixed for detecting a first peak is set to be larger than the gradient fixed for detecting a second peak.

To repeat the above statement, in the present method where the gradient fixed for detecting the first peak is set to be larger than the gradient fixed for detecting the second peak, the detection of the first peak can be expedited, so that it becomes possible to decrease both a poor efficiency in charging with a large current immediately prior to a full charge and a thermal elevation associated with such charging operation.

Also, the provision of the rest time enables the thermal elevation to be reduced to minimum.

The above and further objects and advantages of the invention will become fully apparent from consideration of the following detailed description in conjunction with the accompanying drawings.

DETAILED DESCRIPTION OF THE INVENTION

Embodiments of the present invention will now be discussed in conjunction with the accompanying drawings. It should be noted here that the following embodiments are intended to be illustrative of a battery charging method to embody the technical ideas of the invention, and the inventive charging method is, in no way, limited to the method described below.

Figure 1:
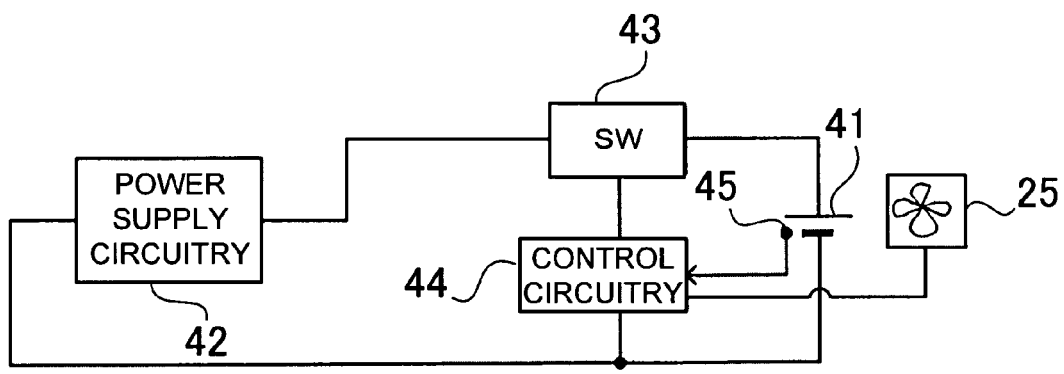
FIG. 1 is a circuit diagram showing an example of the charge circuitry in the battery charger in accordance with an embodiment of the present invention.

A circuitry depicted in FIG. 1 includes: (a) a power supply circuit 42 in which a charge current is supplied to a battery 41 for a charging operation; (b) a switching device 43 which is connected between the power supply circuit 42 and the battery 41 to adjust an average charge current in the battery 41; (c) a control circuit 44 which switches the switching device 43 ON or OFF to increase or decrease the charge current; and (d) a temperature sensor 45 which detects a battery temperature to feed a temperature signal into the control circuit 44, so that the charging operation is terminated, like when the battery temperature exceeds a protection temperature (a rough extent of 60-65° C).

The battery 41, like in a standard size such as AAA, AA, C or D, is placed for use with a battery charger (not shown) so as to be in close contact with a temperature sensor 45. In a case where the battery 41 is available in a battery pack, the temperature sensor 45 is placed to be in close contact with the unit cells in the battery pack. Although not shown, various control operations are performed, using the control circuit 44, in which a voltage is measured on a measuring point at a positive electrode in the battery 41 to detect its peak and also to detect the voltage drop ($-\Delta V$). When detecting a state equivalent to a full charge, the control circuit 44 serves to control either a termination of charging operation or a supplementary charging operation.

The battery charger according to the inventive embodiment is provided with a cooling fan 25 which is controlled by the control circuit 44 to cool the battery 41 by exposing the battery 41 to ambient air.

The power supply circuit 42, with a switching device 43 being ON, has such an output power that charges the battery 41 with a large current, whose average current ranges from 1.5 C to 10 C, preferably from 2 C to 8 C, and more preferably from 2 C to 5 C. The power supply circuit is capable of being exteriorly connected via a lead wire to the control circuit, serving as an adaptor mechanically separated from the control circuit. However, the power supply circuit can also be accommodated in the same case as for the control circuit.

The switching device 43, being a transistor or FET, is switched by the control circuit 44 to pulse-charge the battery 41. The switching device 43, being maintained to be normally ON while not being switched, charges the battery 41 initially with a large current. The switching device 43 is also capable of adjusting its duty ratio of switching ON and OFF, so that the battery 41 can be charged with a large current having a large average current value and/or with a current having a lowered current value. The switching device 43 increases or decreases an average charge current for pulse-charging the battery 41, using the duty ratio which can be switched ON or OFF. An ON/OFF switching cycle for the switching device 43, which is switched by the control circuit 44, ranges from 1 ms to 10 s, preferably from 10 ms to 2 s, and more preferably from 50 ms to 2 s.

Figure 2:
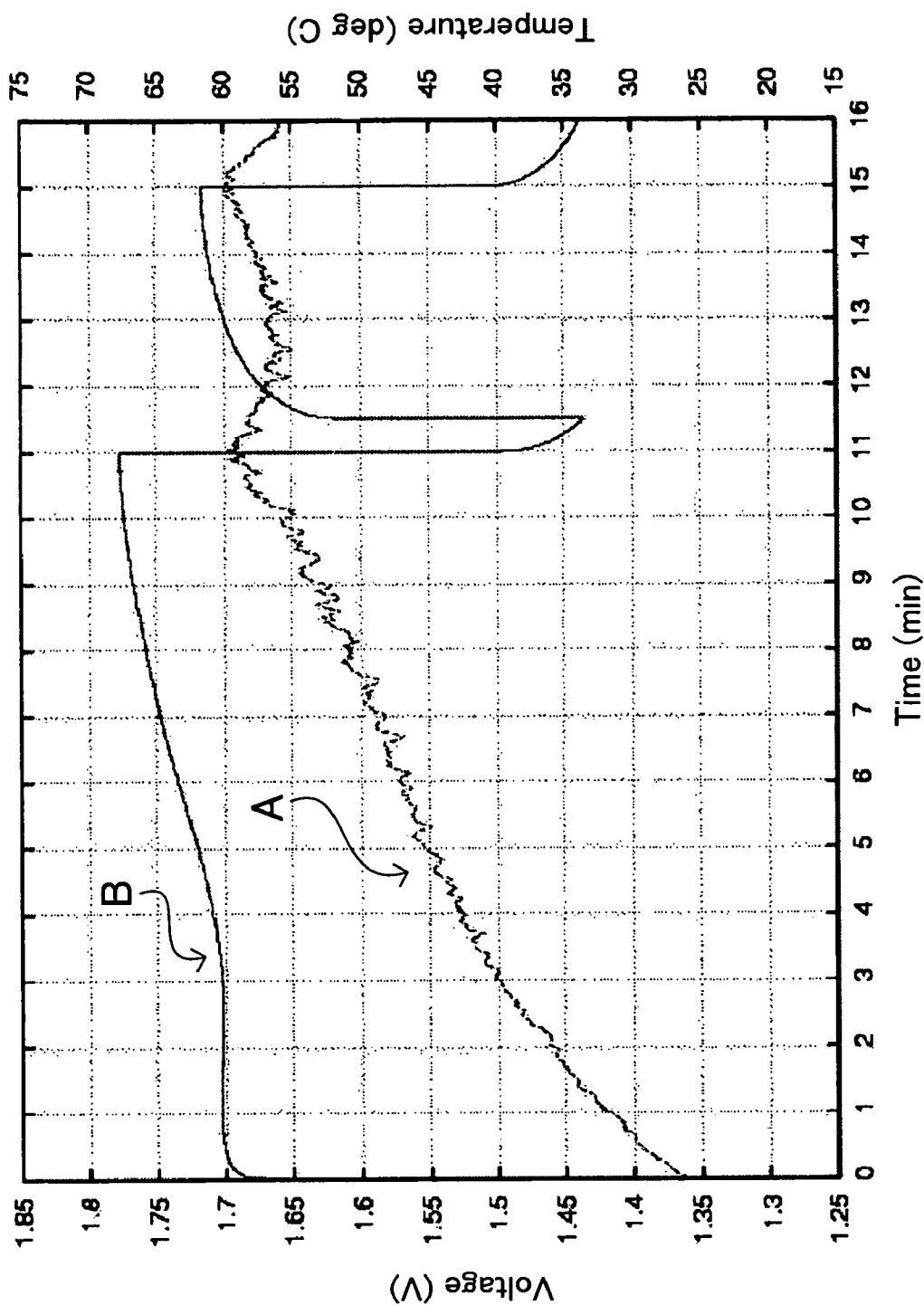
FIG. 2 is a graph showing temperature and voltage characteristics when a battery is charged using the battery charger in accordance with an embodiment of the present invention.

Shown by the graph in FIG. 2 are a characteristic where the battery temperature is elevated while the battery 41 is charged through the charge circuitry and also a characteristic where the battery voltage is varied. In FIG. 2, the curved line A depicts the characteristic where the battery temperature is elevated (the temperature being approximately 27° C. when a charging operation is commenced), while the curved line B depicts the characteristic where the battery voltage is varied.

In the inventive embodiment, the charging operation is performed in the following procedure, as shown by the characteristic graph in FIG. 2. From an instant when the charging operation is commenced, the battery is charged with a constant current which is a predetermined current value (equal to 4 C, but preferably 3 C or more). Then, in the course of the charging operation, the battery continues to be charged, while determining whether the output voltage has reached its peak.

The detection of the peak is determined, based on whether the increase gradient of the output voltage has become smaller than a fixed gradient. In FIG. 2, the charging operation is suspended when the output voltage has become smaller than the fixed gradient. The rest time can thus hamper the battery temperature from being elevated. Duration of such rest time can be set to range roughly from 10 to 60 seconds, but in the inventive embodiment the duration is set to be 30 seconds. The rest time is suitably set such that the temperature of the battery 41 will not exceed the protection temperature (ranging roughly from 60 to 65° C., preferably approximately 63° C., and more preferably approximately 60° C.), which is determined by taking into account a predetermined current value, a subsequent lowered current value, and an air quantity provided by a cooling fan 25. After the rest time, the charging operation is resumed with a lowered current value (equal to 2.9 C, but preferably lower than 3 C). Then, in the course of the charging operation, the battery continues to be charged, while determining whether the output voltage has reached its peak or a voltage drop ($-\Delta V$).

In FIG. 2, the output voltage reaches its peak in approximately 15 minutes after commencement of the charging operation, and the operation is terminated at this point. Actually, when the battery 41 is discharged to check a charge capacity at this point, the battery 41 is found to be 81.9% charged with respect to a specified capacity, which is larger than the 79.8% charge capacity in a comparative example as described below in FIG. 4. Regarding the battery temperature as well, the temperature is found to be suppressed at approximately 60° C. as seen immediately after the detection of the first peak and immediately after the detection of the second peak.

Figure 4:
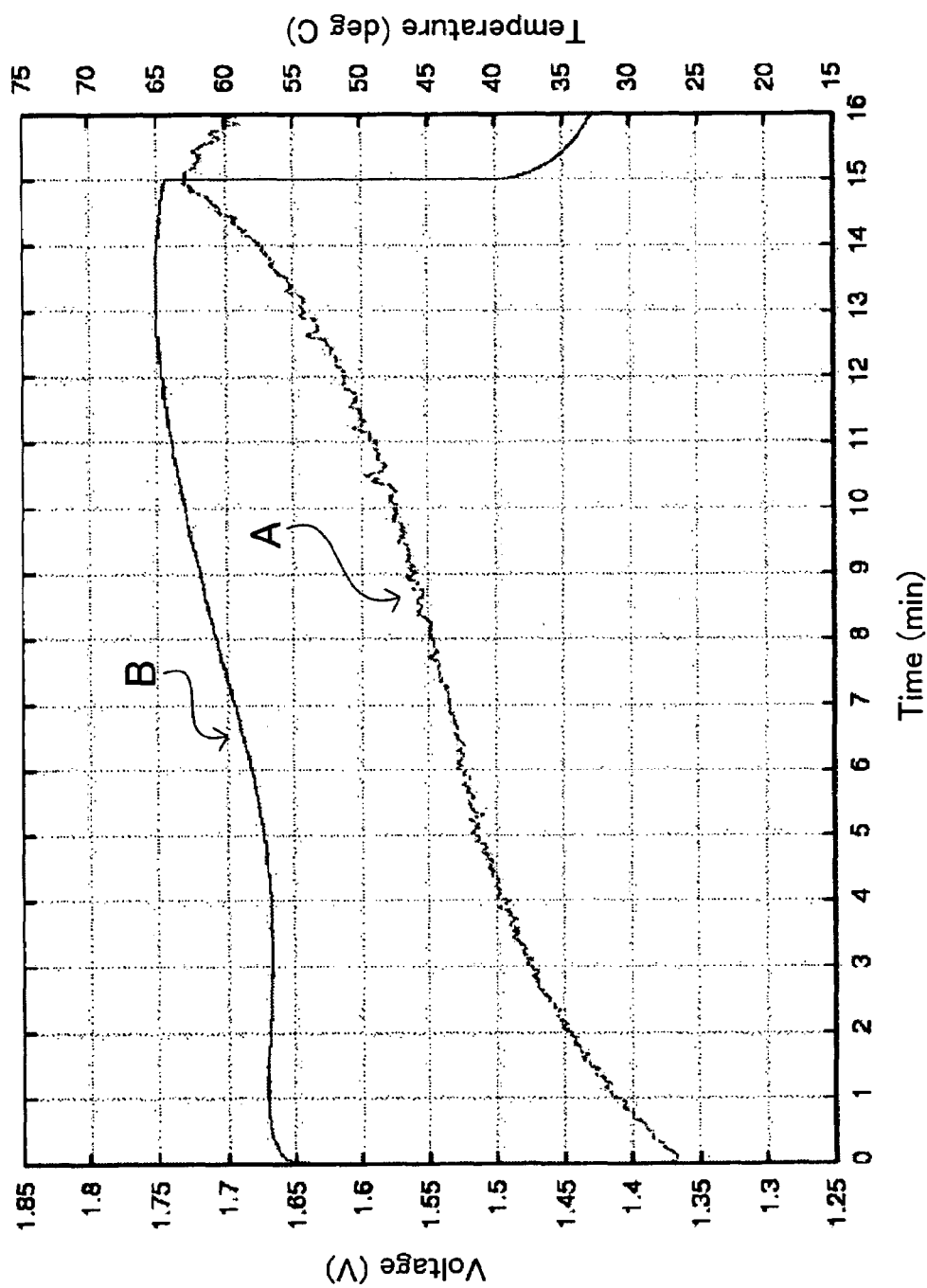
FIG. 4 is a graph showing temperature and voltage characteristics when a battery is charged in accordance with a prior art.

The graph in FIG. 4 has been prepared to indicate a characteristic demonstrated by a prior art, for purposes of comparing with the inventive embodiment. Specifically, a charging operation as per FIG. 4 is performed similarly to the inventive embodiment, in which a curved line A depicts a characteristic where a battery temperature is elevated (the temperature being approximately 27° C. when the charging operation is commenced), and a curved line B depicts a characteristic where a battery voltage is varied.

In the characteristic graph in FIG. 4, the charging operation is performed in the following procedure. From an instant when the charging operation is commenced, the battery is charged with a predetermined large current value (equal to approximately 3.5 C, but preferably 3 C or more). By detecting a voltage drop ($-\Delta V$), e.g., an amount of 20 mV/cell, a full charge is detected and the charging operation is terminated. The voltage drop ($-\Delta V$) is detected 15 minutes after commencement of the charging operation, and the full charge is reached. It can been seen in FIG. 4 that the temperature is sharply elevated to approximately 63° C. immediately prior to the full charge, which adversely affects the secondary battery. The charging operation with a large current yields a poor charging efficiency, and an efficiency is also poor at an elevated, high temperature, so that a sufficient charge capacity is not obtained. When the battery 41 is discharged to check the charge capacity at this point, it is found that the battery is 79.8% charged with respect to a specified capacity. It can also been seen in FIG. 4 that even though the secondary battery has been cooled by means of a cooling fan 25, the temperature is sharply elevated immediately prior to the full charge.

Figure 3:
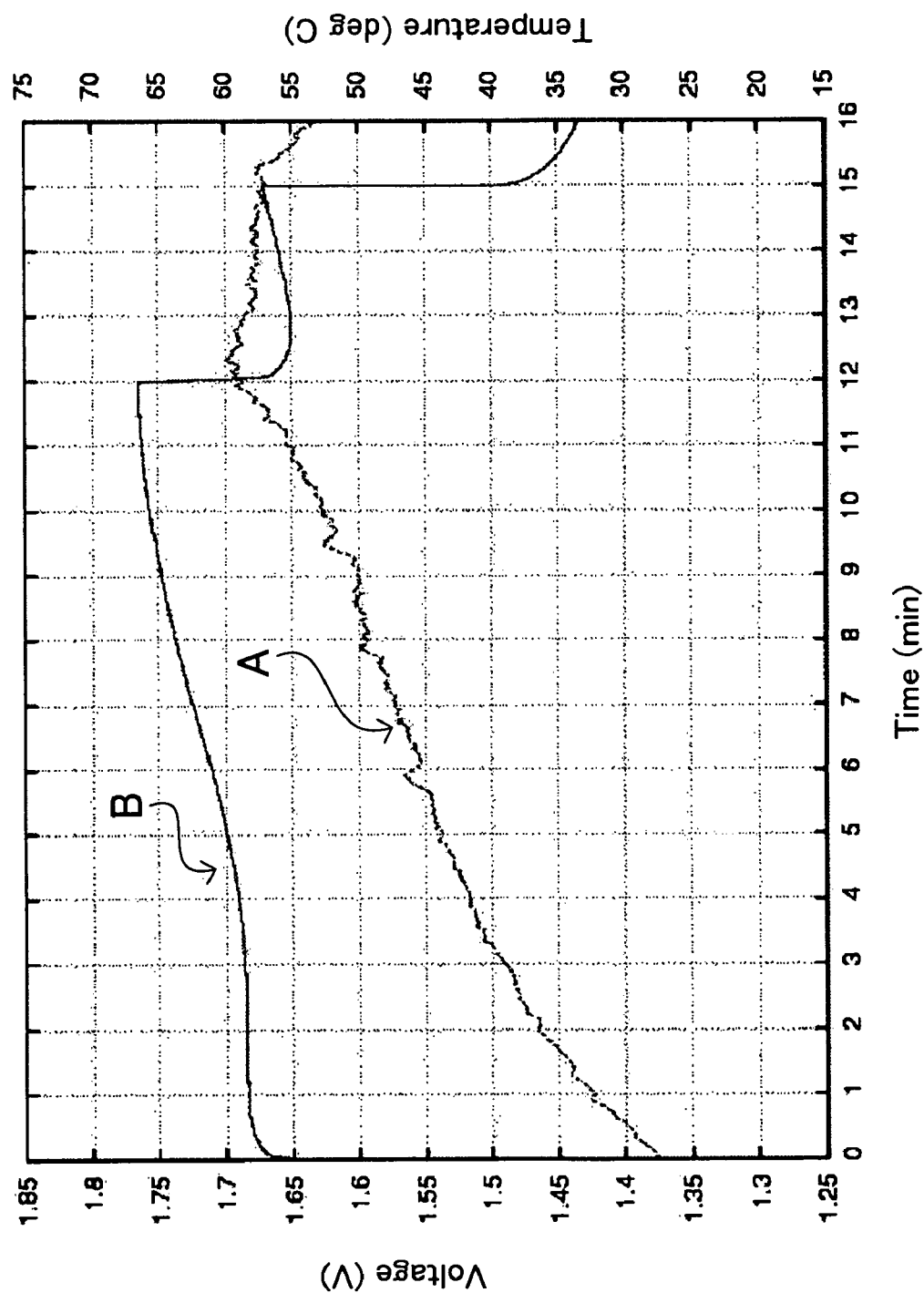
FIG. 3 is a graph showing temperature and voltage characteristics when a battery is charged using the battery charger in accordance with an alternative embodiment of the invention.

Illustrated in FIG. 3 is an alternative embodiment in accordance with the present invention, where the battery is charged in the following procedure, as shown by a characteristic graph in FIG. 3. In FIG. 3, a curved line A depicts a characteristic where a battery temperature is elevated, while a curved line B depicts a characteristic where a battery voltage is varied (at a temperature of approximately 26° C. when the charging operation is commenced). In the present embodiment, the battery is charged with a predetermined current value (equal to 3.8 C, but preferably 3 C or more) from the instant when the charging operation is commenced. Thus, in the course of the charging operation, the battery continues to be charged, while determining whether the output voltage has reached its peak. Detection of such peak is determined, based on whether an increase gradient of the output voltage has become smaller than a fixed gradient. After determining that the output voltage has become smaller than the fixed gradient, the battery continues to be charged with a lowered current value (equal to 2.5 C, but preferably 3 C or lower). In the charging operation with the lowered current value, a state of full charge is determined by detecting a peak of the output voltage or a voltage drop(−ΔV).

With reference to FIG. 3, since a voltage peak or a voltage drop (−ΔV) is not detected, a charging operation is terminated 15 minutes after its commencement, the time being measured with a timer. In the embodiment shown in FIG. 3, a maximum temperature (approximately 60° C.) of the battery is detected immediately after detection of a first peak, while the temperature gradually declines in the course of the charging operation performed with a lowered current value. In the conventional charging method, as shown in FIG. 4, a battery temperature is approximately 63° C. at the point when a voltage drop (−ΔV) is detected 15 minutes after commencement of a charging operation, while, in the inventive embodiment shown in FIG. 3, the temperature is approximately 60° C. immediately after the peak is detected. This means that the maximum temperature is lowered to reduce a thermal adverse influence on the battery 41. Actually, when the battery 41 is discharged to check a charge capacity at this point, the battery is 79.2% charged with respect to a specified capacity. As can been seen from the fact that the charge capacity is 79.8% in the prior art example described above, it has been ascertained that a substantially equivalent charge capacity is obtained.

In the inventive embodiment, the detection of the peak is determined, based on whether an increase gradient of a voltage has become smaller than a fixed gradient (that is to say, the peak is detected when the increase gradient of the voltage has become smaller than the fixed gradient), so that a method is employed as described below. Also in the inventive embodiment, a fixed gradient in detecting the first peak is set to be larger than a fixed gradient in detecting the second peak, as described below.

Two factors are involved in detection of a peak: a duration of time $T(n-1)$ as measured of an output voltage rising by a stipulated amount of voltage (10 mV) and a subsequent duration of time $T(n)$ as required of a battery voltage rising by an amount of 10 mV/cell. The peak is detected when the ratio of $T(n)$ to $T(n-1)$ comes to be above a stipulated magnification (roughly equal to or larger than 1.7 times, preferably 2.0 times for example). Besides, the magnification stipulated for detection of a first peak is set to be smaller than the magnification stipulated for detection of a second peak. For example, the magnification in detecting the first peak is 1.8 times, and the magnification in detecting the second peak is 2.0 times. With this arrangement, the detection of the first peak can be expedited, so that the battery temperature is prevented from undesirably rising more than required.

As can be seen in FIGS. 2, 3 and 4, an output voltage is sharply elevated at an initial stage of the charging operation, or immediately after a resumed charging operation subsequent to a rest time as shown in FIG. 2. The thermal elevation continues in a generally flatly curved line, and then again in an ascending line. In order not to wrongly determine such a generally flat curve to be a state of full charge, detection of a peak voltage and a voltage drop (−ΔV) is not performed for 2 to 6 minutes after commencement of the charging operation, and for 1 to 2 minutes after the rest time.

Referring again to FIG. 3, when the charging operation enters a phase of charging with a lowered current value, the output voltage is dropped substantially, and then again the voltage is elevated. When the control circuit 44 does not discriminate a rise or fall of the output voltage at the point of detecting the peak, the peak is to be detected when a ratio of $T(n)$ to $T(n-1)$ has become larger than a stipulated magnification. During a charging operation which is continued with a lowered current value, the detection of a peak is suspended for 1 to 2 minutes. It is because a peak is likely to be detected also in the stage with the lowered current value, where the output voltage is dropped substantially, being followed by an elevation.

A peak can also be detected in the following manner. The detection is performed when an elevated value of the output voltage during a predetermined time is less than a prescribed value. The prescribed value in detecting a first peak is set to be larger than the prescribed value in detecting a second peak. With this arrangement, the detection of the first peak can be expedited, so that the battery temperature is prevented from undesirably rising more than required. In other words, this method of detecting a peak as well, like the aforesaid method of detecting a peak, is employed for detecting the peak when an increase gradient of the output voltage has become smaller than a fixed gradient, in which a fixed gradient in detecting the first peak is set to be larger than a fixed gradient in detecting the second peak.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. This application is based on Application No. 2005-280965 filed in Japan on Sep. 27, 2005, the content of which is incorporated herein by reference.

What is claimed is:

1. A method for charging a secondary battery with a constant current, comprising:

a first charging of the secondary battery with a first current value until a first peak of output voltage is detected in the secondary battery;

a second charging of the battery being continued with a second current value lower than the first current value; and terminating, subsequently to the second charging, the charging operation by detecting a second peak of output voltage or a voltage drop subsequent to the second peak, wherein the first and second peaks are detected when an increase gradient of output voltage has become smaller than a fixed gradient, and a fixed gradient in detecting the first peak is set to be larger than a fixed gradient in detecting the second peak.

2. The secondary battery charging method as recited in claim 1, further comprising:
   terminating, subsequently to the second charging, the charging operation after a predetermined time has elapsed.

3. The secondary battery charging method as recited in claim 1, wherein the first current value in the first charging is 3 C or more.

4. The secondary battery charging method as recited in claim 1, wherein the second current value in the second charging is 3 C or less.

5. The secondary battery charging method as recited in claim 1, further comprising:
   providing a duration of non-charging, rest time between the first and second charging.

6. The secondary battery charging method as recited in claim 5, wherein the duration of non-charging, rest time is set to be between 10 and 60 seconds.

7. The secondary battery charging method as recited in claim 5, wherein a battery temperature is set not to exceed 65° C. during the non-charging, rest time.

8. The secondary battery charging method as recited in claim 1, wherein the peak is detected when a ratio of Tn to Tn−1 has become larger than a stipulated magnification, where Tn−1 denotes a measured duration of time taken for an output voltage to rise by a stipulated amount of voltage, and T, denotes a subsequent duration of time taken for a battery voltage to rise by an amount of 10 mV/cell.

9. The secondary battery charging method as recited in claim 1, wherein a peak is detected when a stipulated magnification has become equal to or larger than 1.7 times.

10. The secondary battery charging method as recited in claim 9, wherein a stipulated magnification in detecting the first peak is set to be smaller than a stipulated magnification in detecting the second peak.

11. The secondary battery charging method as recited in claim 10, wherein a stipulated magnification in detecting a first peak is set to be 1.8 times, and a stipulated magnification in detecting a second peak is set to be 2.0 times.

12. The secondary battery charging method as recited in claim 1, wherein a peak and a voltage drop are refrained from being detected for 2 to 6 minutes after commencement of a charging operation.

13. The secondary battery charging method as recited in claim 5, further comprising terminating, subsequently to the second charging, the charging operation by detecting a second peak of output voltage or a voltage drop subsequent to the second peak,
   wherein the second peak and a voltage drop are refrained from being detected for 1 to 2 minutes after a non-charging, rest time.

14. The secondary battery charging method as recited in claim 1, wherein the peak is detected when an elevated value of output voltage during a predetermined time is less than a prescribed value.

15. The secondary battery charging method as recited in claim 14, further comprising terminating, subsequently to the second charging, the charging operation by detecting a second peak of output voltage or a voltage drop subsequent to the second peak,
   wherein a prescribed value in detecting the first peak is set to be larger than a prescribed value in detecting the second peak.

* * * * *